United States Patent
Vukovich et al.

(10) Patent No.: US 9,222,378 B2
(45) Date of Patent: Dec. 29, 2015

(54) VARIABLE CAM PHASER

(71) Applicant: GM GLOBAL TECHNOLOGY OPERATIONS LLC, Detroit, MI (US)

(72) Inventors: William P. Vukovich, Wyoming, MI (US); Gerald R. Stabel, Zeeland, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 155 days.

(21) Appl. No.: 13/941,601

(22) Filed: Jul. 15, 2013

(65) Prior Publication Data
US 2015/0019105 A1    Jan. 15, 2015

(51) Int. Cl.
*F01L 1/344* (2006.01)
*F02D 25/00* (2006.01)
*F02D 13/02* (2006.01)
*F02D 41/00* (2006.01)

(52) U.S. Cl.
CPC .............. *F01L 1/344* (2013.01); *F01L 1/3442* (2013.01); *F02D 13/0219* (2013.01); *F02D 25/00* (2013.01); *F01L 2001/34459* (2013.01); *F01L 2001/34469* (2013.01); *F01L 2001/34483* (2013.01); *F02D 2013/0292* (2013.01); *F02D 2041/001* (2013.01)

(58) Field of Classification Search
CPC .................... F01L 1/344; F01L 1/3442; F01L 2001/34453; F01L 2001/34459; F01L 2001/34466; F01L 2001/34469
See application file for complete search history.

(56) References Cited

U.S. PATENT DOCUMENTS

| | | | |
|---|---|---|---|
| 2005/0226736 A1* | 10/2005 | Lancefield et al. | ........... 417/213 |
| 2011/0088645 A1* | 4/2011 | Yamaguchi et al. | ....... 123/90.17 |
| 2012/0317807 A1 | 12/2012 | Vukovich et al. | |
| 2012/0318218 A1* | 12/2012 | Kato | .......... 123/90.12 |
| 2012/0318220 A1 | 12/2012 | Vukovich et al. | |

OTHER PUBLICATIONS

Merriam-Webster Dictionary Online: Definition of "Lock" <http://www.merriam-webster.com/dictionary/lock>.*

* cited by examiner

*Primary Examiner* — Lindsay Low
*Assistant Examiner* — Jacob Amick
(74) *Attorney, Agent, or Firm* — Quinn Law Group, PLLC (57) ABSTRACT

A cam phaser includes a rotor, a stator, and a cover. The rotor defines a first hole and a second hole and can rotate relative to the stator between a first intermediate position and a second intermediate position. The cover is mounted on the stator and defines a first lock pin seat and a second lock pin seat. The cam phaser includes a first lock pin and a second lock pin. The first lock pin can move along the first hole and into the first lock pin seat to lock the rotor relative to the stator at the first intermediate position. The second lock pin can move along the second hole and into the second lock pin seat to lock the rotor relative to the stator at the second intermediate position.

16 Claims, 4 Drawing Sheets

VARIABLE CAM PHASER

TECHNICAL FIELD

The present disclosures relates to variable cam phasers for vehicles such as cars or trucks.

BACKGROUND

Engine assemblies may include a cam phaser that is coupled to an engine camshaft to adjust the timing of intake and/or exhaust valve events. Adjusting valve timing based on engine operating conditions may provide increased engine performance, such as increased power output or torque output. Additional benefits in the form of reduced fuel consumption and/or reduced engine emissions may be realized. Increasing the extent that the camshaft may be advanced or retarded may provide for increased gains in these metrics.

SUMMARY

The present disclosure relates to cam phasers. In an embodiment, the cam phaser includes a stator, rotor, cover, and first and second lock pins. The stator includes a first lobe, a second lobe, and a third lobe. The rotor is rotationally coupled to the stator and includes a first vane, a second vane, and a third vane. The first vane is disposed between the first lobe and the second lobe. The second vane is disposed between the second and third lobes. The rotor defines a first hole extending through the first vane and a second hole extending through the second vane. The rotor is configured to rotate relative to the stator between a first intermediate position and a second intermediate position. The cover is mounted on the stator and defines a first lock pin seat and a second lock pin seat. The first lock pin seat is aligned with the first hole when the rotor is in the first intermediate position. The second lock pin seat is aligned with the second hole when the rotor is in the second intermediate position. The first lock pin is movably disposed in the first hole. The first lock pin is configured to move along the first hole and into the first lock pin seat to lock the rotor relative to the stator at the first intermediate position. The second lock pin is movably disposed in the second hole. The second lock pin is configured to move along the second hole and into the second lock pin seat to lock the rotor relative to the stator at the second intermediate position.

In an embodiment, the first lock pin seat is not aligned with the first hole when the rotor is in the second intermediate position, thereby precluding the first lock pin from entering the first lock pin seat. The second lock pin is not aligned with the second hole when the rotor is in the first intermediate position, thereby precluding the second lock pin from entering the second lock pin seat. The cam phaser further includes a spring operatively coupled to the first lock pin. The spring is configured to bias the first lock pin toward the first lock pin seat. The spring may be a first spring, and the cam phaser may include a second spring operatively coupled to the second lock pin. The second spring is configured to bias the second lock pin toward the second lock pin seat. The cover may be a first cover, and the cam phaser may include a second cover mounted on the stator. The second cover defines a third lock pin seat. The cam phaser may further include a third lock pin movably disposed in the second hole. The third lock pin is configured to be partly disposed in the third lock pin seat to lock the rotor relative to the stator at the second intermediate position. The second spring is operatively coupled to the third lock pin. The second spring is configured to bias the third lock pin toward the third lock pin seat. The second spring is configured to bias the second and third lock pins away from each other. The second hole is aligned with the third lock pin seat when the rotor is at the second intermediate position. The first vane does not contact any of the first, second, and third lobes when the rotor is in the first intermediate position. The second vane does not contact any of the first, second, and third lobes when the rotor is in the second intermediate position.

The present disclosure also relates to vehicles such as cars or trucks. In an embodiment, the vehicle includes an internal combustion engine, an electric motor, and a cam phaser operatively coupled to the internal combustion engine. The cam phaser includes a stator including a first lobe, a second lobe, and a third lobe. In addition, the cam phaser includes a rotor rotationally coupled to the stator. The rotor includes a first vane, a second vane, and a third vane. The rotor defines a first hole extending through the first vane and a second hole extending through the second vane. The rotor is configured to rotate relative to the stator between a first intermediate position and a second intermediate position. The cam phaser further includes a cover mounted on the stator. The cover defines a first lock pin seat and a second lock pin seat. The first lock pin seat is aligned with the first hole when the rotor is in the first intermediate position. The second lock pin seat is aligned with the second hole when the rotor is in the second intermediate position. The cam phaser further includes a first lock pin movably disposed in the first hole. The first lock pin is configured to move along the first hole and into the first lock pin seat to lock the rotor with respect to the stator at the first intermediate position when the internal combustion engine stops and the electric motor is active. The cam phaser further includes a second lock pin movably disposed in the second hole. The second lock pin is configured to be moved along the second hole and into the second lock pin seat to lock the rotor relative to the stator at the second intermediate position when the internal combustion engine stops and the electric motor is inactive.

In an embodiment, the first lock pin seat is not aligned with the first hole when the rotor is in the second intermediate position, thereby precluding the first lock pin from entering the first hole. The second lock pin is not aligned with the second hole when the rotor is in the first intermediate position, thereby precluding the second lock pin from entering the second hole. The vehicle may further include a spring operatively coupled to the first lock pin. The spring is configured to bias the first lock pin toward the first lock pin seat. The spring may be a first spring, and the cam phaser may include a second spring operatively coupled to the second lock pin. The second spring is configured to bias the second lock pin toward the second lock pin seat. The cover may be a first cover, and the cam phaser may include a second cover mounted on the stator. The second cover defines a third lock pin seat. The vehicle may further include a third lock pin movably disposed in the second hole. The third lock pin is configured to be partly disposed in the third lock pin seat to lock the rotor relative to the stator at the second intermediate position.

The present disclosure further relates to methods of controlling a vehicle. In an embodiment, the method includes the following steps: (a) starting an internal combustion engine; (b) stopping the internal combustion engine; (d) determining if an electric motor is active; (e) if the electric motor is active, moving a rotor of a cam phaser to a first intermediate position; and (f) if the electric motor is inactive, moving a rotor of the cam phaser to a second intermediate position. The cam phaser used in this method may be any of the cam phasers described in the present disclosure.

The above features and advantages, and other features and advantages, of the present invention are readily apparent from the following detailed description of some of the best modes and other embodiments for carrying out the invention, as defined in the appended claims, when taken in connection with the accompanying drawings.

DETAILED DESCRIPTION

Figure 1:
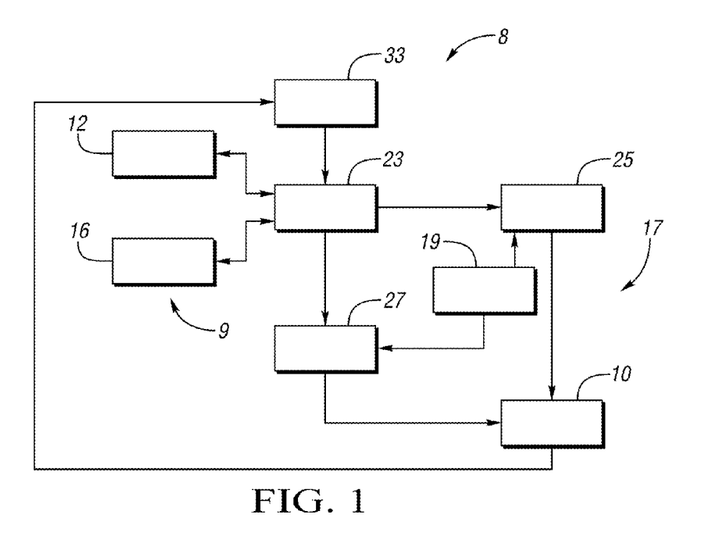
FIG. 1 is a schematic block diagram of a vehicle including a cam phaser.

FIG. 1 is a block diagram schematically illustrating a vehicle 8 such as a car or a truck. The vehicle includes a hybrid powertrain 9, which in turn includes an internal combustion engine 12, an electric motor/generator 16, and a control module 23 such as an engine control module. The engine 12 and the electric motor 16 may be electronically controlled by the control module 23, which may be a conventional microprocessor based engine controller including such common elements as a microprocessor, read only memory ROM, random access memory RAM, electrically programmable read only memory EPROM, high speed clock, analog to digital (A/D) and digital to analog (D/A) circuitry, input/output circuitry and devices (I/O) and appropriate signal conditioning and buffer circuitry. The control module 23 functions to acquire data from a variety of sensors and control a variety of actuators of the engine 12 over a plurality of discrete lines. For simplicity, the control module 23 is shown generally in bi-directional interface with the engine 12 and the electric motor 16 and may be configured to receive signals indicative of various parameters such as camshaft position. In response to these signals, the control module 23 can control one or more actuators such as valves.

The vehicle 8 further includes a cam phaser 10 for regulating the rotational timing of a camshaft (not shown). More specifically, the timing of the camshaft can be retarded or advanced with respect to another camshaft or with respect to a location of the piston within the engine 12. The cam phaser 10 regulates the camshaft based on output signals from a cam position sensor 33. The cam position sensor 33 may include, but is not limited to, a variable reluctance or Hall Effect sensor. The cam position sensor 33 can transmit output position signals indicating the rotational position of the camshaft to the control module 23. Thus, the cam position sensor 33 is electrically connected to the control module 23. In response to the output position signals from the cam position sensor 33, the control module 23 can control one or more pulse width modulated (PWM) control valves 25 and an on/off control valve 27. The on/off control valve 27 and the PWM control valve 25 are in fluid communication with a fluid source 19 containing a fluid such as oil. The PWM control valve 25 and the on/off control valve 27 are electrically connected to the control module 23. The control module 23 can send a PWM command signal to the PWM control valve 25. Upon receipt of the PWM command signal, the PWM control valve 25 actuates to advance or retard the cam phaser 10. Additionally, the control module 23 can send an on/off command signal to the on/off control valve 27. Upon receipt of the on/off command signal, the on/off control valve 27 locks or unlocks the cam phaser 10. The cam phaser 10, cam position sensor 33, the PWM control valve 25, and the on/off control valve 27 may be jointly referred to as a cam phaser system 17.

Figure 2:
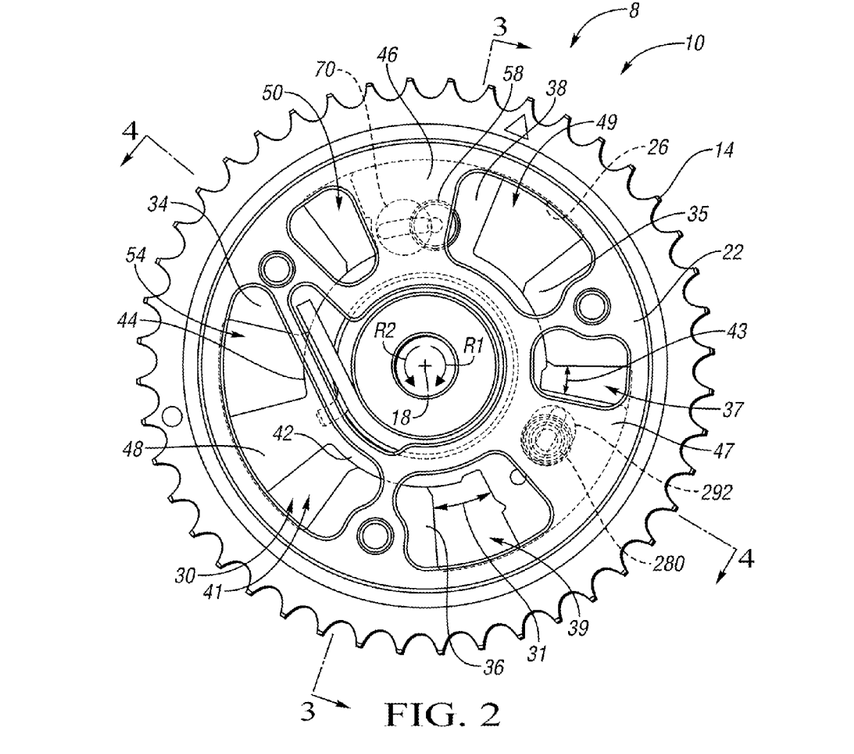
FIG. 2 is a schematic top view of a cam phaser, showing the cam phaser in a "mid park" position.

FIG. 2 schematically illustrates a cam phaser 10, which may be part of the vehicle 8 (FIG. 1). The cam phaser 10 includes a pulley sprocket or gear 14 for engaging a belt chain or gear (not shown) operatively connected to an engine crankshaft (not shown). Accordingly, the sprocket 14 is drivable by the engine crankshaft via the chain for rotation about an axis 18. The cam phaser 10 also includes a stator 22, which is mounted with respect to the sprocket 14 for unitary rotation therewith about the axis 18. The stator 22 has an inner stator surface 26 that defines a chamber 30. The inner stator surface 26 is generally cylindrical, but includes first, second, and third lobes 34, 35, 36 that extend radially inward (toward the axis 18). Although the drawings depict three lobes 34, 35, 36, it is contemplated that the stator 22 may include more or fewer lobes.

The cam phaser 10 also includes a rotor 38 disposed within the chamber 30. The rotor 38 is rotationally coupled to the stator 22 and includes a hub portion 42 having a generally cylindrical outer surface 44. Thus, the rotor 38 can rotate relative to the stator 22 at least between a first intermediate or "end park" position (FIG. 6) and a second intermediate or "mid park" position (FIG. 2) as described in detail below. Further, the rotor 38 includes first, second, and third vanes 46, 47, 48 that extend outwardly from the hub portion 42. While the drawings show three vanes, it is envisioned that the rotor 38 may have more or fewer vanes. Irrespective of the number of vanes, each vane 46, 47, 48 contacts a respective cylindrical portion of the inner stator surface 26 of the stator 22. Each of the vanes 46, 47, 48 is disposed between two of the lobes 34, 35, 36. For example, in the depicted embodiment, the first vane 46 is disposed between the first and second lobes 34, 35; the second vane 47 is disposed between the second and third lobes 35, 36; and the third vane 48 is disposed between the first and third lobes 34, 36. Each of the first, second, and third lobes 34, 35, 36 contacts a cylindrical portion of the outer rotor surface 44 of the rotor 38.

The first lobe 34 may be spaced apart from first vane 46. As such, the rotor 38 and the stator 22 may jointly define a first chamber 50 between the first lobe 34 and the first vane 46. The first lobe 34 may also be spaced from the third vane 48. Accordingly, the rotor 38 and the stator 22 may together define a second chamber 54 between the first lobe 34 and the third vane 48. The second lobe 35 may be spaced apart from the first vane 46. Consequently, the rotor 38 and the stator 22 may collectively define a third chamber 49 between the second lobe 35 and the first vane 46. The second lobe 35 may be spaced apart from the second vane 47. Thus, the rotor 38 and the stator 22 jointly define a fourth chamber 37 between the second lobe 35 and the second vane 47. The second vane 47 may be spaced apart from the third lobe 36. Accordingly, the rotor 38 and the stator 22 may define a fifth chamber 39 between the second vane 47 and the third lobe 36. The third lobe 36 may be spaced apart from the third vane 48. The rotor 38 and the stator 22 may therefore define a sixth chamber 41 between the third lobe 36 and the third vane 48. The chambers 50, 54, 49, 37, 39, and 30 can be selectively pressurized by hydraulic fluid to cause the rotor 38 to rotate about the axis 18 with respect to the stator 22 and thereby change the valve timing of the engine 12.

The rotor 38 is mounted with respect to the camshaft (not shown). Accordingly, rotating the rotor 38 relative to the stator 22 in one direction (e.g, first rotational direction R1) will advance valve timing. Alternatively, rotating the rotor 38 relative to the stator 22 in the first rotational direction R1 may retard valve timing. For illustration purposes only, FIG. 2 shows the cam advance authority or range 31 of the phaser 10. Rotating the rotor 38 relative to the stator 22 in the other direction (e.g., second rotational direction R2) will retard valve timing. Alternatively, rotating the rotor 38 relative to the stator 22 in the second rotational direction R2 may advance valve timing. For illustration purposes only, FIG. 2 shows the cam retard authority or range 43. The movement of the rotor 38 relative to the stator 22 is limited by interference between the lobes 34, 35, 36 and the vanes 46, 47, 48. For example, maximum valve timing advance may occur when the second vane 47 contacts third lobe 36, and maximum valve timing retard may occur when the second vane 47 contacts the second lobe 35.

Typical cam phasers have a positive stop position by using the interference between the stator and the rotor to stop the rotational movement of the rotor at engine shut down. To enhance the engine performance during engine start-up, however, it is desirable to lock the cam phaser at an intermediate position where this natural positive stop is not present, i.e., the rotor does not rest against the stator. In hybrid vehicles, it is desirable to lock the cam phaser at different intermediate positions during cold engine start-up and hot engine start-up. As used herein, the term "engine cold start" means that the engine 12 starts after being shut-down for a predetermined period of time and is therefore cold or at least not hot. For example, an engine cold start may occur at a garage when the vehicle operator starts the engine for the first time in a day. In a hybrid vehicle, for example, the engine cold start may occur while the electric motor is inactive. The "engine hot start" occurs after an engine has been shut down during a hybrid operation in which the vehicle 8 uses an electric motor for propulsion. The engine hot start may also occur during a start/stop operation in which the engine is shut down when certain conditions are met. For instance, the engine may be shut down when the vehicle stops at a traffic light. In a hybrid vehicle, for example, an engine hot start may occur while the electric motor is active. Since the optimal engine conditions for "cold starts" and "hot starts" may differ, it is desirable to develop a cam phasing capable of locking at a first intermediate position optimal for hot engine starts and at a second intermediate position optimal for cold engine starts.

Figure 3:
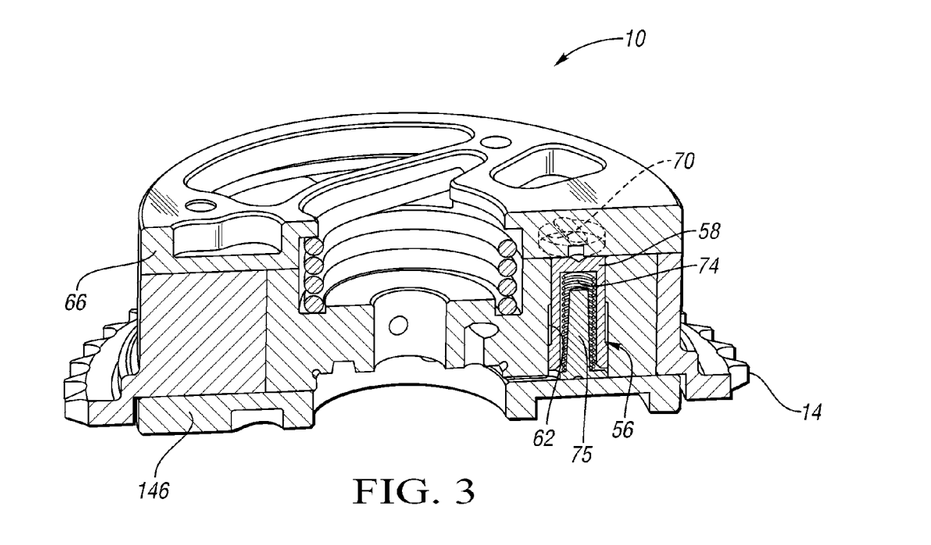
FIG. 3 is a schematic, sectional, side perspective view of the cam phaser of FIG. 2, taken along section line 3-3 of FIG. 2.

With reference to FIGS. 2 and 3, a locking mechanism 56 includes a first lock pin 58 that is at least partially disposed within a first hole 62 (e.g., cylindrical bore) formed in the first vane 46. Specifically, the first lock pin 58 is movably disposed in the first hole 62. The first hole 62 and the first lock pin 58 are oriented and dimensioned such that movement of the first lock pin 58 relative to the rotor 38 is substantially limited to linear translation parallel to the axis 18. The first lock pin 58 is movable relative to the rotor 38 between an extended position and a retracted position as shown in FIG. 3. In the extended position, the first lock pin 58 protrudes from the rotor hole 62, and in the retracted position, the first lock pin 58 does not protrude substantially from the first rotor hole 62.

Figure 6:
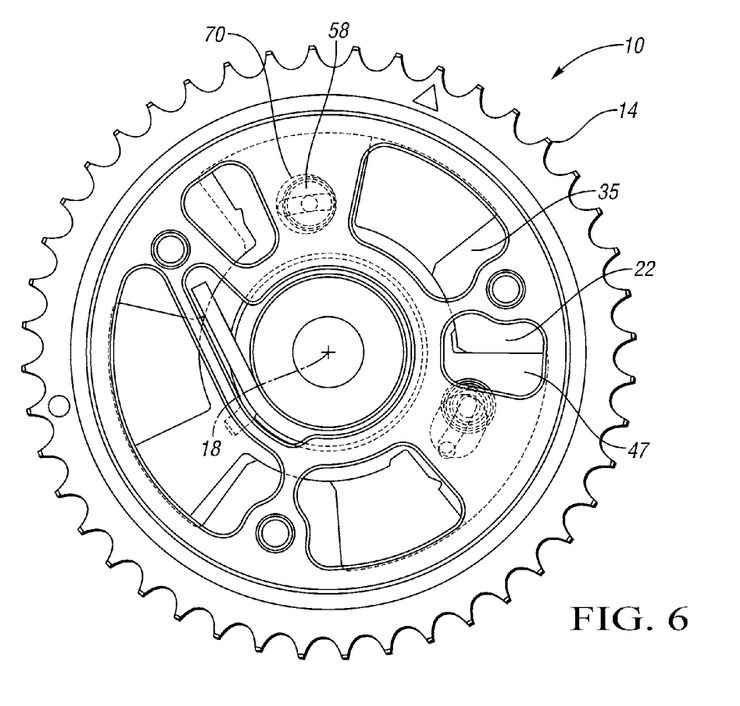
FIG. 6 is a schematic top view of a cam phaser, showing the cam phaser of FIG. 2 in an "end park" position.

A first or front cover 66 is mounted with respect to the stator 22 to seal one end of the chamber 30. For instance, the first cover 66 may be mounted on the stator 22. A second or rear cover 146 is mounted with respect to the stator 22 to seal the other end of the chamber 30. For example, the second cover 146 may be mounted to the stator 22. The first cover 66 defines a cavity (e.g., concavity) that functions as a first lock pin seat 70 for the first lock pin 58. Alternatively, the first lock pin seat 70 may be defined by the second cover 146. The first lock pin seat 70 is disposed in the first cover 66 such that the first lock pin seat 70 is aligned with the first lock pin 58 when the rotor 38 is in an "end park" or first intermediate position relative to the stator 22 as shown in FIG. 6, where the first and third vanes 46, 48 are not in contact with any of the first and third lobes 34, 36. In the "end park" position, the second lobe 35 is in contact with the second vane 47, but the second lobe 35 is not in contact with the first vane 46. Further, in the "end park" position, the second vane 47 is not in contact with the third lobe 36. Accordingly, the first hole 62 is substantially aligned with the first lock pin seat 70 when the rotor 38 is in the first intermediate position. When the rotor 38 is in the end park position and the first lock pin 58 is in the extended position, a portion of the first lock pin 58 is in the first lock pin seat 70, and another portion of the first lock pin 58 is in the first hole 62. Accordingly, the first lock pin 58 locks the rotor 38 relative to the first cover 66 and the stator 22. A first spring 74 is disposed within the first hole 62 and biases the first lock pin 58 toward the extended position. A retainer 75 may be partly disposed within the first spring 74 to minimize wear of the first spring 74. The first lock pin 58 is retractable by applying hydraulic pressure. For instance, pressurized oil can be fed into the first hole 62 or the first lock pin seat 70 to move the first lock pin 58 away from the first lock pin seat 70 and toward its retracted position. Unless the first lock pin seat 70 is properly aligned with the first lock pin 58 as shown in FIG. 6, the first lock pin 58 cannot enter the first lock pin seat 70, and thus the rotor 38 will not lock. When the rotor 38 is in the second intermediate or "mid park" position, the first lock pin seat 70 is not aligned with the first lock pin 58, thereby precluding the first lock pin 58 from entering the first lock pin seat 70. Thus, the first lock pin seat 70 is not aligned with the first hole 62 when the rotor 22 is in the second intermediate position, thereby precluding the first lock pin 58 from entering the first lock pin seat 70.

Figure 4:
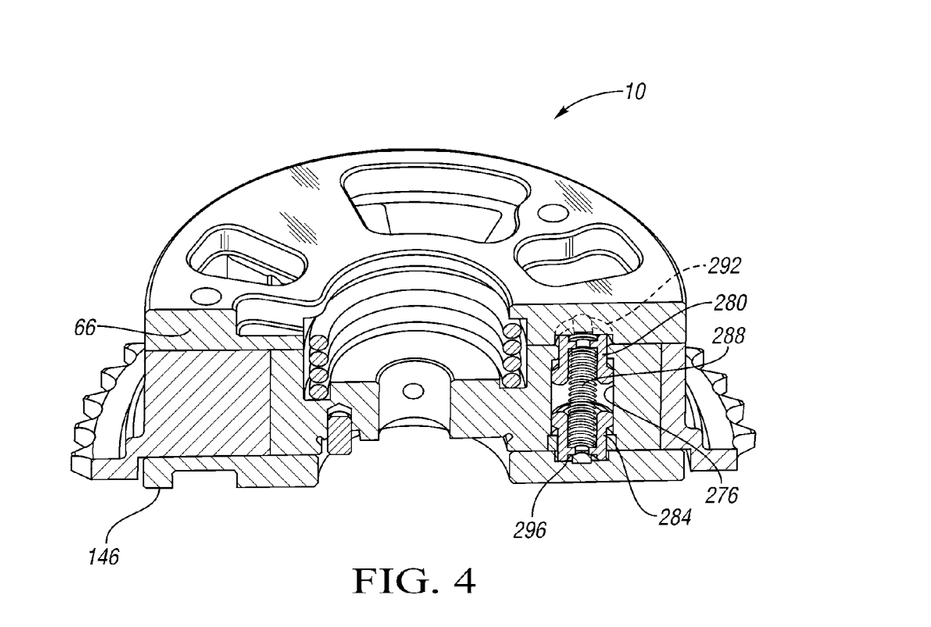
FIG. 4 is a schematic, sectional, side perspective view of the cam phaser of FIG. 2, taken along section line 4-4 of FIG. 2.
Figure 5:
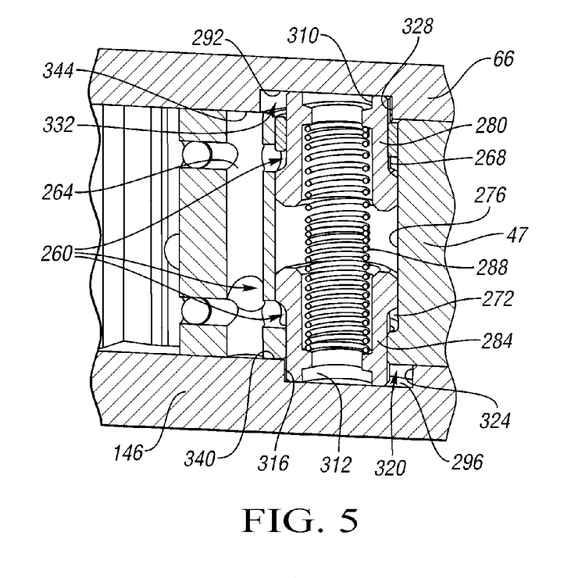
FIG. 5 is a schematic, sectional view of a portion of the cam phaser of FIG. 2.

With reference to FIGS. 4 and 5, as understood by those skilled in the art, it may be desirable to lock the rotor 38 relative to the stator 22 in a "mid park" or second intermediate position, as shown in FIG. 2, i.e., where the first, second, and third vanes 46, 47, 48 are not in contact with any of the first, second, and third lobes 34, 35, 36. At engine start-up, the cam phaser 10 is in the mid park position (FIG. 6). Oil 260 that is pressurized by the engine oil pump (not shown) enters passage 264 (which is formed within the second vane 47) and equally pressurizes the first and second vane chambers 268, 272. The second vane 47 defines a second hole 276 (e.g., cylindrical bore), and two lock pins 280, 284 that are selectively translatable within the second hole 276 parallel to axis 18. The lock pin 280 may also be referred to as the second lock pin, and the lock pin 284 may be referred to as the third lock pin. The second lock pin 280 cooperates with the surface of the second hole 276 to define the first vane chamber 268. The second and third lock pins 280, 284 may be referred to as the intermediate pins. The third lock pin 284 cooperates with the surface of the second hole 276 to define the second vane chamber 272. A second spring 288 is disposed between the second and third lock pins 280, 284 within the second hole 276 and biases the second and third lock pins 280, 284 apart from one another and toward respective extended positions. As the oil pressure is applied to the first and second vane chambers 268, 272, the pressure overcomes the bias of the second spring 288, and the second and third lock pins 280, 284 retract towards each other, thereby disengaging from second and third lock pin seats 292, 296 and allowing movement of rotor 38 to the limits given by the stator. The second and third lock pin seats 292, 296 are formed within first and second covers 66, 146, respectively. The first and second covers 66, 146 are mounted to the stator 22.

The second spring 288 is designed such that neither the second lock pin 280 nor the third lock pin 284 disengages prior to the minimum operating pressure but yet allows for disengagement of both pins at the maximum operating pressure. The chambers 50, 54, 49, 37, 39, and 30 are fed with oil pressure typical of cam phasers using a 3-position spool valve. The first and second vane chambers 268, 272 use an additional oil supply using an on/off control valve 27 (FIG. 1) and can be fed with that oil for disengaging the second and third lock pins 280, 284 from the second and third lock pin seats 292, 296, respectively.

During engine shut-down, the second and third lock pins 280, 284 move into the second and third lock pin seats 292, 296, respectively, to lock the rotor 38 in its mid park position. When the rotor 38 is not in the second intermediate position, the second hole 276 is not aligned with the second and third lock pin seats 292, 296, thereby precluding the second and third lock pins 280, 284 from entering the second and third lock pin seats 292, 296, respectively. The oil pressure applied to the lock pins 280, 284 via the first and second vane chambers 268, 272 is removed using the on/off control valve 27 (FIG. 1) when the engine 12 is keyed off. During engine keyed off, the engine 12 stops and the electric motor 16 may become inactive (i.e., is turned off). After the oil pressure is removed from the second and third lock pins 280, 284, the second spring 288 can then exert a biasing force to the second and third lock pins 280, 284 into the direction of their respective second and third lock pin seats 292, 296. Hydraulic locking does not occur due to the first and second pin holes 310, 312 in the ends of second and third lock pins 280, 284. The elongated nature of the second and third lock pin seats 292, 296 allows time for the second and third lock pins 280, 284 to fall into the lock pin seats 292 and 296 as the rotor 38 moves to a commanded shut down position.

At its final rest position, the third lock pin 284 is in contact with the wall 316 of third lock pin seat 296, while a first gap 320 exists between the third lock pin 284 and the wall 324 of the third seat 296. Similarly, at its final rest position, the second lock pin 280 is in contact with the wall 328 of second lock pin seat 292, while a second gap 332 exists between the second lock pin 280 and the wall of the second lock pin seat 292. Either lock pin 280, 284 can engage its respective lock pin seat 292, 296 prior to the other.

The first cover 66 includes a first surface 344 that faces the rotor 38 and that surrounds the second lock pin seat 292. The second cover 146 includes a second surface 340 that faces the rotor 38 and the first surface 344 and that surrounds the third lock pin seat 296. The rotor 38 is selectively rotatable with respect to the stator 22 about axis 18.

Figure 7:
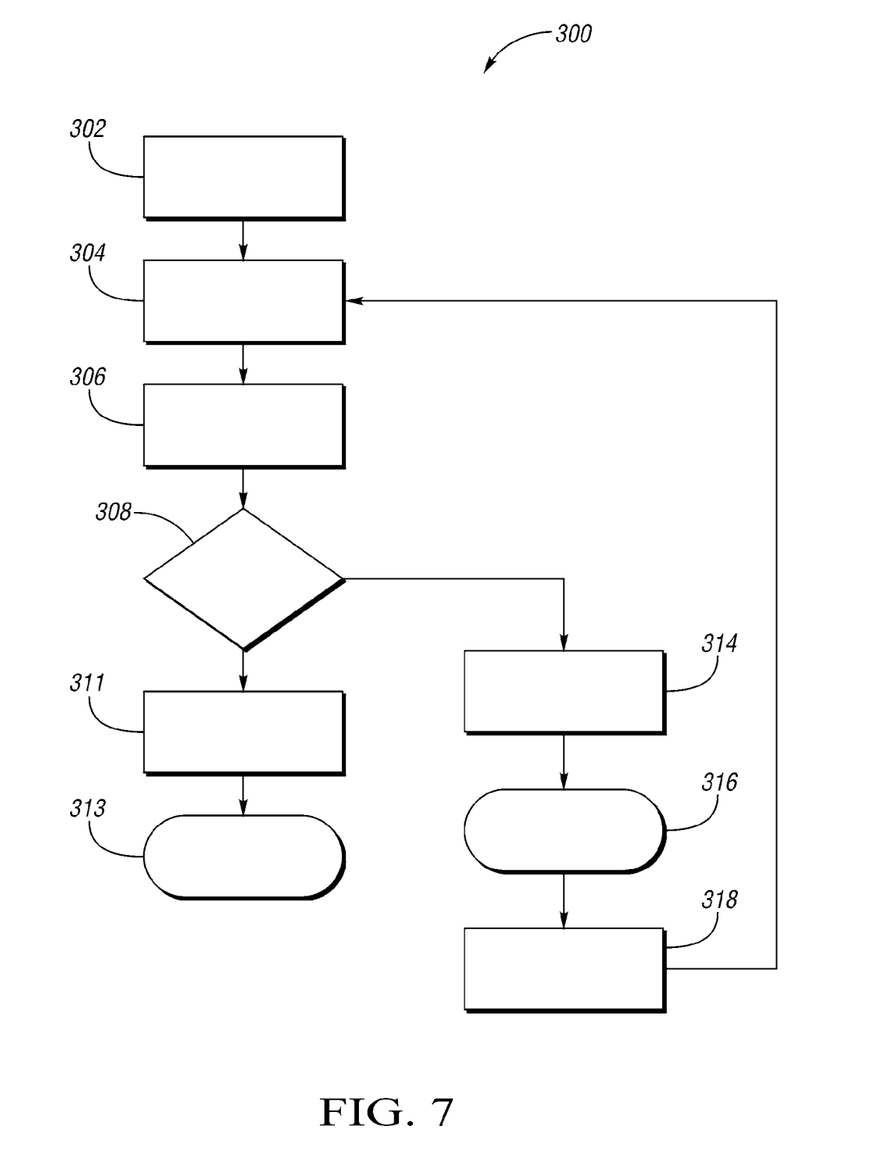
FIG. 7 is a flowchart illustrating a method of controlling the vehicle of FIG. 1.

FIG. 7 is a flowchart illustrating a method 300 of controlling the vehicle 8. In the method 300, step 302 represents an engine cold start or start-up. As used herein, the term "engine cold start" means that the engine 12 starts after being shut-down for a predetermined period of time and is therefore cold or at least not hot. For example, an engine cold start may occur at a garage when the vehicle operator starts the engine 12 for the first time in a day. During a normal engine cold start, the electric motor 16 may be turned off (i.e., inactive) and pressurized oil 260 enters the chambers 50, 54, 49, 37, 39, 30 (FIG. 2) through passages (not shown) in the rotor 38. The pressurized oil 260 can be fed into the chambers 50, 54, 49, 37, 39, 30 through the cam (not shown), and the flow of the pressurized oil 260 can be controlled by the PWM oil control valve 25.

Once the oil pressure in the chambers 50, 54, 49, 37, 39, 30 (FIG. 2) is adequate for control, the engine 12 begins to operate at step 304, and the on/off control valve 27 actuates to feed pressurized oil 260 into the first and second vane chambers 268, 272 (FIG. 5) in order to retract the second and third lock pins 280, 284 (FIG. 5) from the second and third lock pin seats 292, 296, respectively. The cam phaser system 17 (FIG. 1) can now control the cam advance and retard positions using the PWM control valve 25. Specifically, the PWM control valve 25 can control the oil pressure in the chambers 50, 54, 49, 37, 39, 30 as is known in the art in order to control the angular position of the rotor 38 with respect to the stator 22.

In step 306, the engine 12 stops. Then, in step 308, the control module 23 (FIG. 1) determines the method of engine stop. In particular, the control module 23 determines if the engine 12 stopped due to a normal key-off operation by the vehicle operator or because of a hybrid operation or start/stop system. The normal key-off operation occurs when vehicle operator manually stops the engine 12 by, for example, removing the vehicle key from the ignition (not shown). The engine 12 may be stopped during a hybrid operation when the vehicle 8 uses the electric motor 16 (not the engine 12) to propel the vehicle 8. The vehicle 8 may also include a start/stop system (not shown) in which the engine 12 is stopped when certain conditions are met. For instance, the start/stop system may shut down the engine 12 when the vehicle 8 stops at a traffic light. To determine the kind of engine stop, the control module 23 may determine whether the engine stop occurred while the electric motor 16 was active or inactive. For example, the control module 23 may determine if the electric motor 16 remains active or inactive after the engine 12 stopped.

If the control module 23 determines that the engine 12 stopped due to a manual key-off operation, the control module 23 commands the cam phaser system 17 to move the rotor 38 of the cam phaser 10 to the second intermediate position at step 311. For instance, if the electric motor 16 is inactive (i.e., turned off) after the engine stops at step 306, the control module 23 commands the cam phaser system 17 to move the rotor 38 to the second intermediate position. Specifically, using the PWM control valve 25, the cam phaser system 17 controls the oil pressure in the chambers 50, 54, 49, 37, 39, 30 to rotate the rotor 38 with respect to the stator 22 until the rotor 38 reaches the second intermediate position as shown in FIG. 2. When the rotor 38 is in the second intermediate position relative to the stator 22, the second and third lock pins 280, 284 are aligned with the second and third lock pin seats 292, 296, respectively. Accordingly, the second hole 276 is substantially aligned with the second and third lock pin seats 292, 296 when the rotor 38 is in the second intermediate position. Subsequently, the control module 23 commands the on/off control valve 27 to shut off the supply of oil to the first and second vane chambers 268, 272 at step 313. As a consequence, the second spring 288 biases the second and third lock pins 280, 284 toward the second and third lock pin seats 292, 296, respectively. Once the second and third lock pins 280, 284 are disposed in the second and third lock pin seats 292, 296, respective, the cam phaser 10 is locked and the rotor 38 cannot move relative to the stator 22. At this point, the engine 12 is shut down and is ready for a cold engine start.

If the control module 23 determines that the engine 12 stopped due to a hybrid operation or a start/stop system operation, the control module 23 commands the cam phaser system 17 to move the rotor 38 to the first intermediate position at step 314. For example, if the control module 23 determines that the electric motor 16 is active (i.e., turned on) after the engine 12 stopped, the control module 23 commands the rotor 38 to move to the first intermediate position relative to the stator 22. Specifically, using the PWM control valve 25, the cam phaser system 17 controls the oil pressure in the chambers 50, 54, 49, 37, 39, 30 to rotate the rotor 38 with respect to the stator 22 until the rotor 38 reaches the first intermediate position. In the first intermediate position, the first lock pin seat 70 is aligned with the first lock pin 58. Then, the control module 23 commands the on/off control valve 27 (FIG. 1) to shut off supply of oil to the first hole 62 or the first lock pin seat 70 at step 316. Consequently, the first spring 74 biases the first lock pin 58 toward the first lock pin seat 70. Once the first lock pin 58 is partly disposed in the first lock pin seat 70, the cam phaser 10 is locked and the rotor 38 cannot move relative to the stator 22. At this point, the engine 12 is shut down and is ready for a hot engine start. At step 318, the engine 12 may efficiently begin a hot start. The hot engine start refers to the situation when the engine 12 starts after it was stopped due to a hybrid operation or a start/stop system operation (as discussed above). After the engine hot start, the engine 12 may continue to operate at step 304. During normal engine operation, the cam phaser system 17 may continue to control the operation of the cam phaser 10 using the PWM valve 25 as it is known in the art.

The detailed description and the drawings or figures are supportive and descriptive of the invention, but the scope of the invention is defined solely by the claims. While some of the best modes and other embodiments for carrying out the claimed invention have been described in detail, various alternative designs and embodiments exist for practicing the invention defined in the appended claims.

The invention claimed is:

1. A variable cam phaser, comprising:
   a stator including a first lobe, a second lobe, and a third lobe;
   a rotor rotationally coupled to the stator, the rotor including a first vane, a second vane and a third vane, the first vane being disposed between the first lobe and the second lobe, the second vane being disposed between the second and third lobes, the rotor defining a first hole extending through the first vane, the rotor defining a second hole extending through the second vane, the rotor being configured to rotate relative to the stator between a first intermediate position and a second intermediate position;
   a cover mounted on the stator and defining a first lock pin seat and a second lock pin seat, the first lock pin seat being aligned with the first hole when the rotor is in the first intermediate position, the second lock pin seat being aligned with the second hole when the rotor is in the second intermediate position;
   a first lock pin movably disposed in the first hole, the first lock pin being configured to move along the first hole and into the first lock pin seat to lock the rotor relative to the stator at the first intermediate position, wherein the first lock pin seat is not aligned with the first hole when the rotor is in the second intermediate position, thereby precluding the first lock pin from entering the first lock pin seat; and
   a second lock pin movably disposed in the second hole, the second lock pin being configured to move along the second hole and into the second lock pin seat to lock the rotor relative to the stator at the second intermediate position, wherein the second lock pin seat is not aligned with the second hole when the rotor is in the first intermediate position, thereby precluding the second lock sin from entering the second lock sin seat.

2. The variable cam phaser of claim 1, further comprising a spring operatively coupled to the first lock pin, the spring being configured to bias the first lock pin toward the first lock pin seat.

3. The variable cam phaser of claim 2, wherein the spring is a first spring, and the cam phaser includes a second spring operatively coupled to the second lock pin, the second spring being configured to bias the second lock pin toward the second lock pin seat.

4. The variable cam phaser of claim 2, wherein the cover is a first cover, and the variable cam phaser includes a second cover mounted on the stator, the second cover defining a third lock pin seat.

5. The variable cam phaser of claim 4, further comprising a third lock pin movably disposed in the second hole, the third lock pin being configured to be partly disposed in the third lock pin seat to lock the rotor relative to the stator at the second intermediate position.

6. The variable cam phaser of claim 5, wherein the second spring is operatively coupled to the third lock pin, the second spring being configured to bias the third lock pin toward the third lock pin seat.

7. The variable cam phaser of claim 6, wherein the second spring is configured to bias the second and third lock pins away from each other.

8. The variable cam phaser of claim 4, wherein the second hole is aligned with the third lock pin seat when the rotor is at the second intermediate position.

9. The variable cam phaser of claim 8, wherein the first vane does not contact any of the first, second, and third lobes when the rotor is in the first intermediate position.

10. The variable cam phaser of claim 9, wherein the second vane does not contact any of the first, second, and third lobes when the rotor is in the second intermediate position.

11. A vehicle, comprising:
    an internal combustion engine;
    an electric motor;
    a variable cam phaser operatively coupled to the internal combustion engine, the variable cam phaser including:
      a stator including a first lobe, a second lobe, and a third lobe;
      a rotor rotationally coupled to the stator, the rotor including a first vane, a second vane and a third vane; the rotor defining a first hole extending through the first vane, the rotor defining a second hole extending through the second vane, the rotor being configured to rotate relative to the stator between a first intermediate position and a second intermediate position;
      a cover mounted on the stator and defining a first lock pin seat and a second lock pin seat, the first lock pin seat being aligned with the first hole when the rotor is in the first intermediate position, the second lock pin seat being aligned with the second hole when the rotor is in the second intermediate position;
      a first lock pin movably disposed in the first hole, the first lock pin being configured to move along the first hole and into the first lock pin seat to lock the rotor with respect to the stator at the first intermediate position when the internal combustion engine stops and the electric motor is active, wherein the first lock pin seat is not aligned with the first hole when the rotor is in the second intermediate position, thereby precluding the first lock pin from entering the first lock pin seat;

a second lock pin movably disposed in the second hole, the second lock pin being configured to be moved along the second hole and into the second lock pin seat to lock the rotor relative to the stator at the second intermediate position when the internal combustion engine stops and the electric motor is inactive, wherein the second lock pin seat is not aligned with the second hole when the rotor is in the first intermediate position, thereby precluding the second lock pin from entering the second lock pin seat;

wherein the first lock pin fixes the rotor relative to the stator when positioned in the first lock pin seat such that the rotor is prevented from moving relative to the stator; and wherein the second lock pin fixes the rotor relative to the stator when positioned in the second lock pin seat such that the rotor is prevented from moving relative to the stator.

12. The vehicle of claim 11, further comprising a spring operatively coupled to the first lock pin, the spring being configured to bias the first lock pin toward the first lock pin seat.

13. The vehicle of claim 12, wherein the spring is a first spring, and the variable cam phaser includes a second spring operatively coupled to the second lock pin, the second spring being configured to bias the second lock pin toward the second lock pin seat.

14. The vehicle of claim 13, wherein the cover is a first cover, and the variable cam phaser includes a second cover mounted on the stator, the second cover defining a third lock pin seat.

15. The vehicle of claim 14, further comprising a third lock pin movably disposed in the second hole, the third lock pin being configured to be partly disposed in the third lock pin seat to lock the rotor relative to the stator at the second intermediate position.

16. A method of controlling a vehicle including a variable cam phaser, the variable cam phaser including a stator, a rotor, a cover, a first lock pin, and a second lock pin, the method comprising:

determining if an electric motor is active;

if the electric motor is active, moving a rotor of the variable cam phaser to a first intermediate position;

if the electric motor is inactive, moving a rotor of the variable cam phaser to a second intermediate position; and wherein the stator includes a first lobe, a second lobe, and a third lobe;

wherein the rotor is rotationally coupled to the stator, the rotor including a first vane, a second vane and a third vane, the rotor defining a first hole extending through the first vane, the rotor defining a second hole extending through the second vane, the rotor being configured to rotate relative to the stator between the first intermediate position and the second intermediate position;

wherein the cover is mounted on the stator and defining a first lock pin seat and a second lock pin seat, the first lock pin seat being aligned with the first hole when the rotor is in the first intermediate position, the second lock pin seat being aligned with the second hole when the rotor is in the second intermediate position;

wherein the first lock pin is movably disposed in the first hole, the first lock pin being configured to move along the first hole and into the first lock pin seat to lock the rotor with respect to the stator at the first intermediate position, and the first lock pin seat not being aligned with the first hole when the rotor is in the second intermediate position, thereby precluding the first lock pin from entering the first lock pin seat; and wherein the second lock pin is movably disposed in the second hole, the second lock pin being configured to move along the second hole and into the second lock pin seat to lock the rotor relative to the stator at the second intermediate position, and the second lock pin seat not being aligned with the second hole when the rotor is in the first intermediate position, thereby precluding the second lock pin from entering the second lock pin seat.

* * * * *